United States Patent [19]

Ondrus et al.

[11] Patent Number: 5,831,151
[45] Date of Patent: Nov. 3, 1998

[54] SYSTEM AND METHOD FOR MONITORING THE PROPORTIONAL VOLUME OF CONSTITUENTS PROVIDED TO A MIXTURE

[75] Inventors: Daniel Joseph Ondrus; David J. Chesney, both of Northville, Mich.

[73] Assignee: Ford Global Technologies, Inc., Dearborn, Mich.

[21] Appl. No.: 764,946

[22] Filed: Dec. 13, 1996

[51] Int. Cl.$^6$ .......................... G01N 27/00; G01N 33/00; G01R 33/12

[52] U.S. Cl. ...................... 73/61.41; 73/61.42; 73/61.71; 324/204

[58] Field of Search ................................. 73/61.41, 61.42, 73/61.71; 324/204

[56] References Cited

U.S. PATENT DOCUMENTS

| | | |
|---|---|---|
| 3,606,261 | 9/1971 | Zdenek et al. . |
| 3,736,500 | 5/1973 | Berkowitz et al. ................ 73/61.71 X |
| 4,243,059 | 1/1981 | Hammon et al. . |
| 4,651,092 | 3/1987 | Brunsch et al. . |
| 4,944,185 | 7/1990 | Clark, Jr. et al. . |
| 5,156,298 | 10/1992 | LaRue . |

OTHER PUBLICATIONS

W. G. Clark, Jr., "*Magnetic Tagging Monitors Bond Integrity and Thickness,*" Jun. 1992, pp. 22–26, *Adhesive Age*.
W. G. Clark, Jr. "*Tagging Lets You Test the Untestable,*" Apr. 1990, pp. 59–69, *Advanced Materials and Processes*.
Georgia–Pacific Corporation, *Lignosite® FML,* Product Information Sheet, (2 pages).
W. G. Clark, Jr., et al, "*Tagged Adhesives for Improved Electromagnetic Inspection,*" Jan. 1990, pp. 60–64, *Materials Evaluation*.

*Primary Examiner*—Hezron E. Williams
*Assistant Examiner*—Daniel S. Larkin
*Attorney, Agent, or Firm*—Paul K. Godwin

[57] ABSTRACT

Ferromagnetic tagging material is suspended in a constituent of a two constituent mixing system. Two tagging material sensors are employed that respectively monitor the tagged constituent as it flows in the system alone and the mixed constituents as they flow to a dispenser nozzle. A monitor calculates the volumetric ratio of the two constituents present when mixed based upon the concentration of tagging material sensed by each sensor. A warning is given when the calculated ratio exceeds predetermined limits.

18 Claims, 4 Drawing Sheets

SYSTEM AND METHOD FOR MONITORING THE PROPORTIONAL VOLUME OF CONSTITUENTS PROVIDED TO A MIXTURE

FIELD OF THE INVENTION

1. Field of the Invention

The present invention is directed to the field of constituent mixture process control and more specifically to the area of real-time monitoring the volume ratio of flowing constituents as they are dispensed as a mixture.

2. Description of the Prior Art

In the field of constituent mixture process control, such as that dealing with adhesive dispensing, there is a need to monitor and verify that the volume of constituents in a mixture are maintained in predetermined proportions. This is necessary because leaks in tubing, pump failures, blockage, and other faults can cause constituent proportions to change when mixed.

In one prior art implementation, it was standard procedure to periodically take mixed samples in predetermined volumes from the mixture dispensing nozzle and weigh the samples. Because of the known relative densities of the constituents, an off-line determination could be made from the weight of the mixture of whether or not the constituents were within a predetermined range of acceptable volume ratios. If the mixture were determined to be out of range, adjustments could be made to the supply side of the appropriate constituent in order to restore the mixture to acceptable proportions.

The use of ferromagnetic particles as tagging materials in solutions is well know and has been documented by William J. Clark in articles and patents cited herewith. In his article entitled "Magnetic Tagging Monitors Bond Integrity and Thickness", *Adhesives Age* June, 1992, tagging was suggested as suitable for use in an adhesive system to monitor the presence and thickness of adhesives after they are applied. He further suggests a method of process control in which one or both constituents of a two part adhesive contains tagging material. The flow of the tagged constituent(s) is(are) monitored with a single ferromagnetic detector as the constituents flow through a mixing nozzle for application. Clark states that: "Once tagged with the magnetic particles, the adhesive resin exhibits an electromagnetic signature that can be used to monitor adhesive flow and even quantity delivered." (page 26)

The system suggested by Clark has been found to be acceptable for sensing the presence of material flowing in the mixing nozzle by the use of a sensor located at the nozzle. However, in a two part adhesive system in which one constituent is a resin and the other is a hardener, it was found to be unreliable when attempting to monitor or control the volume ratio of constituents. This is because the distribution of tagging material throughout a constituent (concentration) is difficult to maintain as a constant, homogeneous suspension. This is especially so when a tagged constituent is provided from a large reservoir. The results from monitoring the mixing nozzle in such a situation is that the signal from the tagging sensor varies with the concentration of suspended tagging material flowing through the mixing nozzle.

SUMMARY OF THE INVENTION

The present invention overcomes the deficiencies in the prior art by providing a system in which two sensors are employed to monitor the concentration of tagged material in a first constituent and to monitor the mixture, of a two constituent mixture.

The system uses a sensing device for sensing the concentration of the tagging material as it flows in the first constituent. After the two constituents are mixed, a second sensing device senses the concentration of the tagging material present in the mixed constituents. By sensing the concentration of the tagging material in both the single constituent and the mixed constituents, the system is able to compare the readings and determine the volume ratio of the two constituents present in the mixing device.

Therefore, when the concentration of the tagging material varies, the actual signal from each sensing device correspondingly varies. However, such variation will have no effect on the actual volume ratio that is being monitored. Once the ratio is determined, the ratio can be compared with a range of acceptable ratios and the system can be shut down or warning given when the ratio is outside predetermined control limits.

For a more precise measurement, the system and method compensates for the lag time between when the concentration is sensed upstream in the constituent alone and later when the same material reaches the mixture and is sensed in the mixture.

In an alternative embodiment, the pumping volume of the individual constituents can be adjusted in order to keep the ratio precisely within a controlled limit.

Therefore, it is an object to the present invention to employ tagging materials in at least one constituent of a two constituent mixing system and to provide tagging sensors to monitor a flowing volume of at least one tagged constituent and a second sensor to monitor the combined constituents at a mixing device.

It is another object of the present invention to provide a method and system for comparing the sensed tagging concentrations and determining a real-time mix ratio of the two constituents.

It is another object of the present invention to provide a method and system that warns an operator when the mix ratio of the two constituents varies outside predetermined range limits of acceptable ratios.

It is a further object of the present invention to provide a method and system which can be adapted to provide real-time feedback to a supply controller for each constituent and adjust that supply to maintain a predetermined ratio at a mixing device.

DETAILED DESCRIPTION OF THE PREFERRED EMBODIMENT

Figure 1:
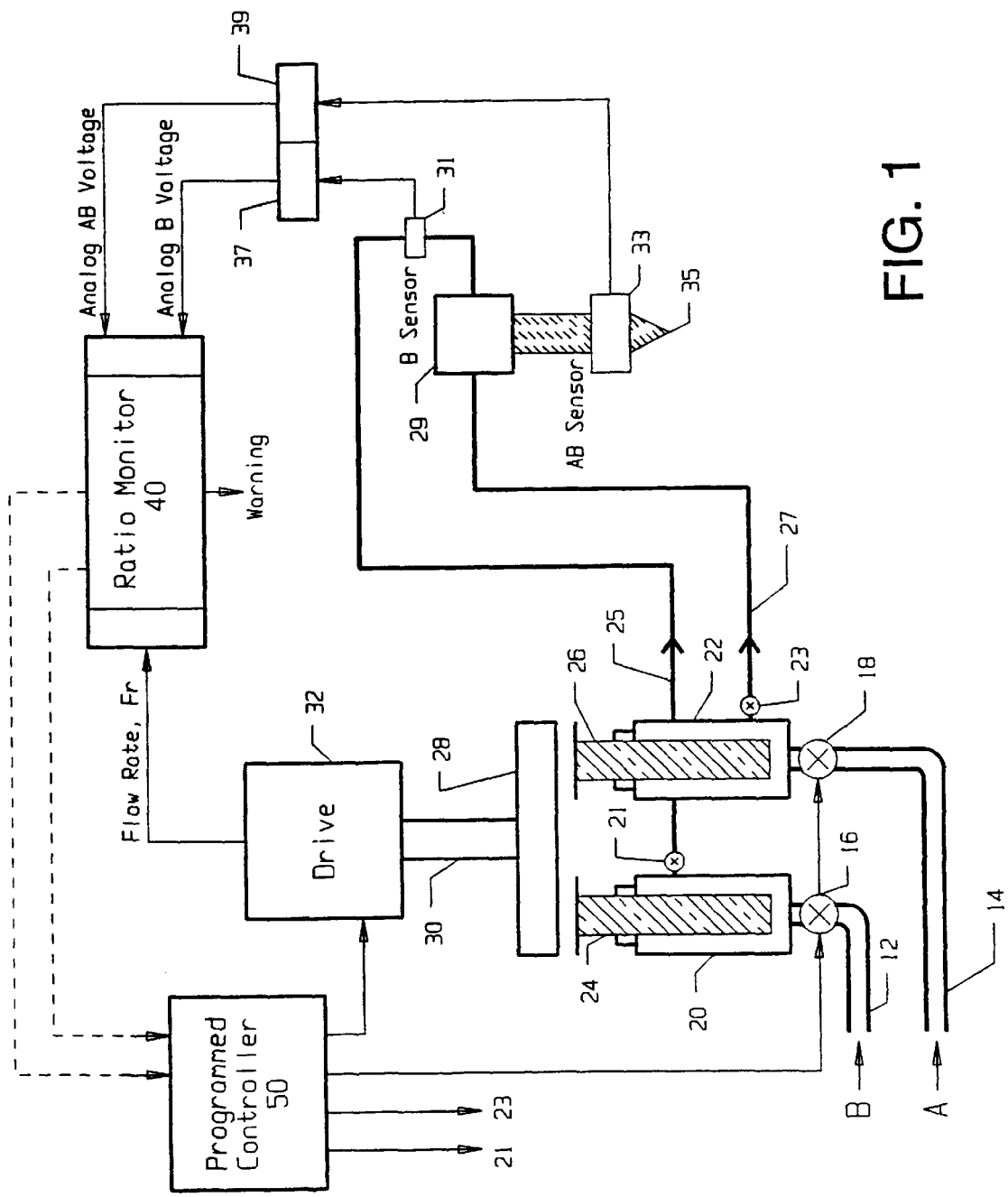
FIG. 1 is a schematic diagram showing a system that embodies the present invention.

The present invention is embodied in an adhesive dispensing system shown in FIG. 1. In that system, a two part adhesive mixture is dispensed from a nozzle 35 onto a work piece or joints between several work pieces (not shown).

The adhesive consists of a resin constituent (B) and a hardener constituent (A). The two constituents are provided under pressure from separate reservoirs or drums (not shown) to metering cylinders and conduits which provide the flowing constituents to the mixing nozzle 35 at a predetermined ratio. The proper proportion of resin to hardener (mix-ratio) is critical to ensure the quality of adhesion between the surfaces of workpieces.

As mentioned in the Summary, at least one of the constituents contains tagging material. In this case, ferromagnetic particle fillers are in suspension throughout the constituent material. Usually, tagging material is added to the constituent by the manufacturer prior to shipment to the user of the system. Most manufacturers attempt to provide a constituent in which the tagging material is evenly distributed throughout the volume. However, as mentioned earlier, sometimes there is variation in the concentration of tagging material in a particular volume of constituent and between batches.

While the concentration value, by itself, of tagging material in a particular constituent is not critical in prior art monitoring systems, the concentration needs to be maintained at a constant level. If it varies, a prior art monitoring system might produce false alarms.

The present invention adapts to such variations in concentration while monitoring the volume ratio of the two constituents present and flowing through a mixing device and dispensing nozzle. It achieves that end by monitoring a first constituent containing tagging material as it flows alone and monitoring the mixed constituents down-stream. The system then determines the concentrations of tagging material flowing at each sensor and calculates the volume ratio of the constituents present at the mixing sensor.

In FIG. 1, the two constituents B and A are respectively provided via conduits 12 and 14 from reservoir drums and pumps (not shown) to control valves 16 and 18. Control valves 16 and 18 are electrically operated to be opened or closed by the output of a conventional programmed controller 50.

Metering cylinders 20 and 22 store the required volume of each constituent in predetermined proportions prior to mixing. Metering rods 24 and 26 are forced upwards when valves 16 and 18 are opened and the respective pressured constituents flow into the metering cylinders until the tops of the metering rods 24 and 26 are stopped by a plate 28. The plate 28 is connected to a plunger rod 30 which is movable along its axis and controlled in that movement by a drive mechanism 32. After the constituents are supplied to the metering cylinders 20 and 22, the valves 16 and 18 are closed. When it is appropriate for the system to commence a single or series of dispensing cycles wherein adhesive is dispensed from the nozzle 35, the programmed controller 50 opens valves 21 and 23 at the outputs of the metering cylinders 20 and 22. The valves 21 and 23 are respectively connected to conduits 25 and 27 which provide flowing volumes of the B and A constituents to a mixing valve 29. The flowing volume in each conduit 25 and 27 is determined by the volumetric characteristics of the metering cylinders, and associated metering rods. (Although the metering cylinders and rods illustrated in FIG. 1 appear to be the same size, they are constructed in appropriate volumetric proportions to allow the constituents to flow out to conduits in predetermined volumetric proportions.)

Upon command from the programmed controller 50, the drive unit 32, which may be a motor or a pneumatic source, forces the two metering rods 24 and 26 into their respective cylinders. The speed of the drive controls the respective flow rates of the constituents to and through the mixing nozzle 35. The flowing constituents A and B are mixed at the mixing valve 29 and dispensed through the nozzle 35.

In this embodiment, only the B constituent contains a ferromagnetic tagging material. A tagging material sensor 31 is located on the conduit 25 in order to sense the concentration of tagging material present in the B constituent prior to mixing. Since the tagging material in this embodiment is a ferromagnetic material, the conduit 25 is nonferromagnetic and the sensor 31 is an eddy current sensor of conventional design. (It is, of course, understood that as other types of tagging materials and their associated sensors are developed, they may be suitable for substitution in this embodiment or a similar embodiment.)

A second sensor 33, of the same type as sensor 31, is located at the mixing valve 29, preferably very close to the dispensing nozzle 35. Sensor 33 senses the concentration of tagging material present in the mixture of the A and B constituents as it is flowingly dispensed.

Sensors 31 and 33 are respectively connected to eddy current modules 37 an 39 where the effect of the concentration of tagging material present at each sensor 31 and 33 is reflected in separate B and AB analog voltage signals. A ratio monitor 40 reads the B and AB signals and determines the volumetric ratio of the two constituents present at nozzle 35 and provides a warning when the ratio changes to a value that is outside a predetermined range of acceptable values.

The ratio monitor 40 also receives a flow rate input signal from drive unit 32. This is in the form of a voltage having a value that corresponds to the value of voltage applied to drive unit 32. Drive unit 32 contains a variable speed motor or pump that responds to the applied voltage in a fashion that tracks with the flow rate in conduit 25, for instance, in a predetermined relationship. The flow rate is used by the ratio monitor to provide a more precise determination of the proportional ratio of the two constituents at mixing nozzle 35.

Figure 2:
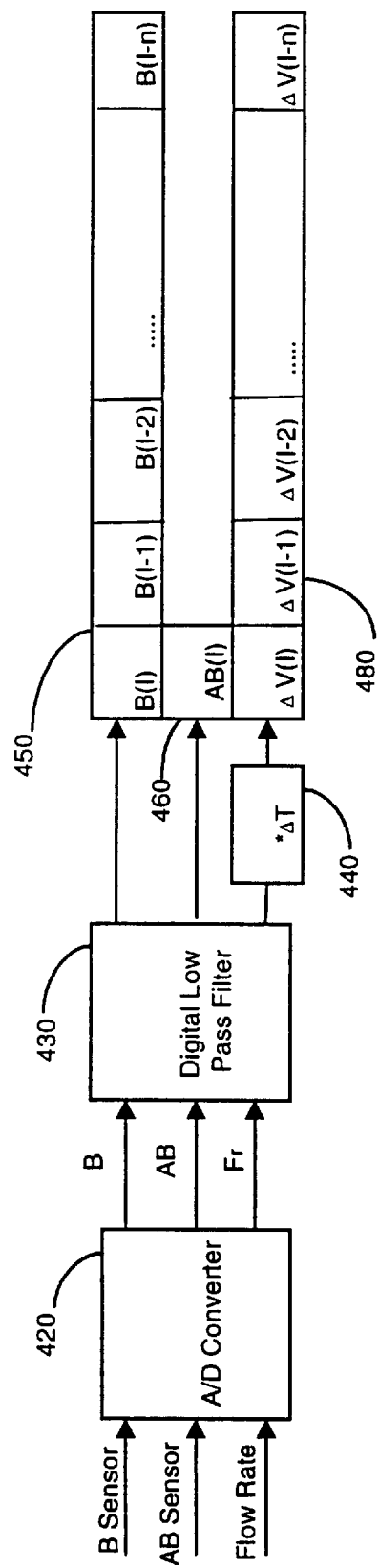
FIG. 2 is a schematic diagram showing the flow of information within the ratio monitor shown in FIG. 1.

FIG. 2 provides a schematic depiction of how the signals and data are processed in ratio monitor 40. The analog voltages indicating the output from B sensor 31, AB sensor 33, and the flow rate "$F_r$," are input into an A/D converter 420 and output as digital signals to a digital low pass filter 430. As each signal is sampled, it is stored in separate registers. The B value is stored in register 450 as B(I) as the immediate reading of sensor B. As each subsequent cycle of sampling the signals occurs, the B value is shifted to the next of "n" locations in register 450. In a register 460, only the immediate reading of the AB sensor value is stored, for immediate processing. The flow rate signal, when used, is multiplied by a sampling cycle time "$\Delta T$" at 440 and stored in a register 480, for reasons that are explained below.

Figure 3:
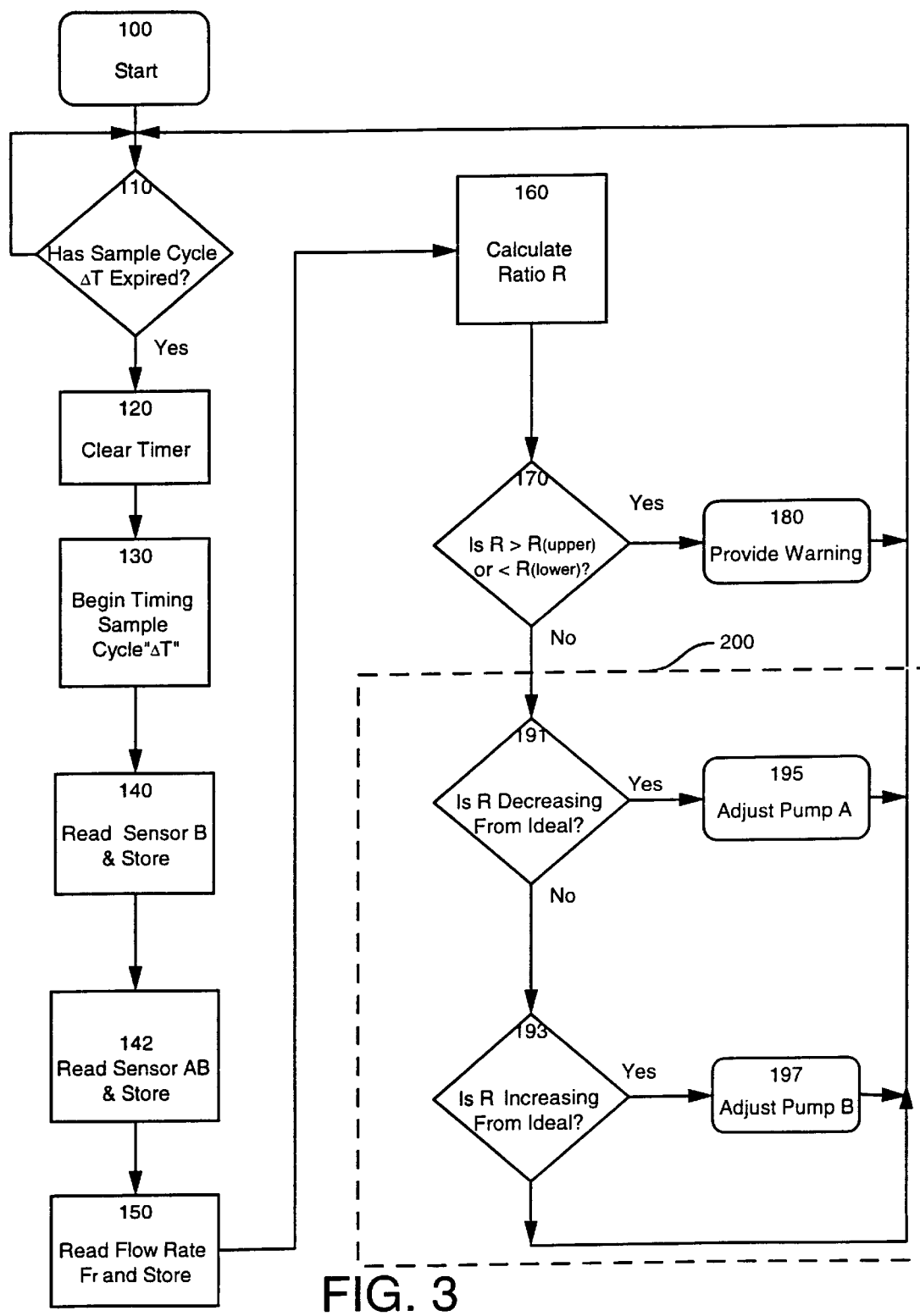
FIG. 3 is a flow diagram of the method used to implement the present invention.

FIG. 3 contains a flow chart of the steps employed to implement the present embodiment. Starting at step 100, a sampling cycle commences at step 110. In this embodiment, a sampling cycle is performed approximately every 10 milliseconds. Therefore, $\Delta T=10$ msec. The inquiry step 110 is used to control the commencement of each successive sampling cycle. If the previous sampling cycle time $\Delta T$ has expired and step 110 results in a "Yes," the timer is reset or cleared at step 120 to begin anew at step 130. If stop 110 results in a "No", step 110 is repeated.

At step 140, the B sensor is read and stored (see FIG. 2). At step 142, the AB sensor is read and stored. At step 150, the flow rate $F_r$ is read and stored. The volumetric ratio R is then calculated in step 160.

Figure 4:
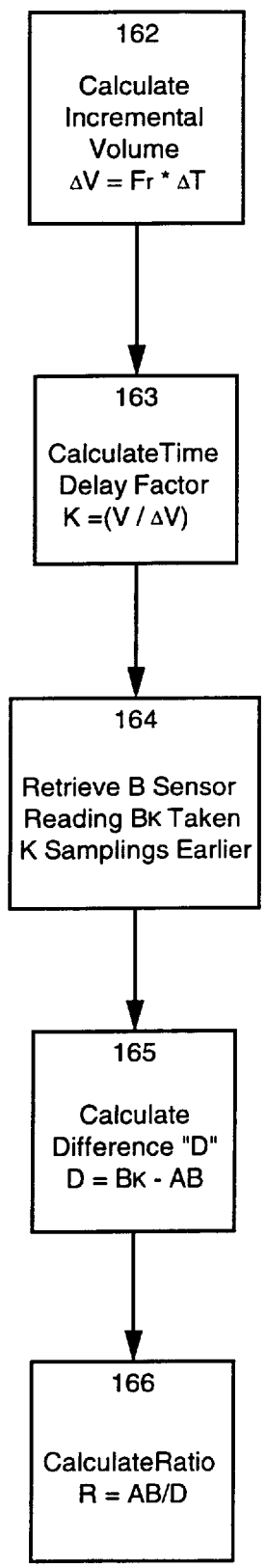
FIG. 4 is a flow diagram detailing the method used to calculate the ratio of the two constituents as employed in the preferred embodiment.

The volumetric ratio can be calculated in a number of ways. For instance, in a gross sense, the readings from the B sensor 31 and the AB sensor 33 which correspond to the concentration levels of tagged material in the B constituent alone and in the mixed constituents, can be compared with a predetermined range of acceptable concentration values in a look-up table to determine if the readings are acceptably proportioned. However, for a more precise measurement, the method of calculating the ratio is shown in FIG. 4. That method, accommodates for the fact that the B sensor 31 is at a known distance and volume of B material upstream from the AB sensor 33. That fact means that because of the variations in concentration discussed above, it is possible that the concentration of tagging material sensed by B sensor 31 at any particular sampling moment may be different from the concentration in the B constituent when mixed with the A constituent at the AB sensor 33 further down stream. Therefore, in order to get an accurate ratio calculation, the sensor readings corresponding to the same volume of constituent material present at the sensors, at different times, are used in the calculation.

In FIG. 4, the ratio calculation step is detailed. In step 162, an incremental volume "$\Delta V$" is calculated from the flow rate $F_r$ multiplied by the sampling cycle time $\Delta T$. This value is stored in the register 480 as discussed with respect to FIG. 2. The incremental volume is that portion of the total known volume "V" of B constituent existing between the two sensors 31 that is flowing past the B sensor during a sampling cycle period. If the flow rate $F_r$ is constant, the incremental volume calculations will be the same for each sampling cycle. In step 163, a time delay factor "K" is calculated based on the known volume V and the calculated $\Delta V$. The time delay factor K is used to determine the number of sampling cycles it takes for the B constituent material to move between the two sensors 31 and 33 and, therefore, which previous B sensor reading will be compared with the present AB sensor reading.

At step 164, the previous B sensor reading "$B_K$" that corresponds to K previous sampling cycles is read from the register 450. Then the actual volumetric ratio "R"=$AB/(B_K-AB)$ is calculated in steps 165 and 166. In step 165, the ratio denominator difference "D" is calculated and in step 166, the division is performed. The value for ratio R from step 160 is then used to determine whether the constituents are being supplied to the mixing nozzle within proportional control limits set for the system.

Returning to FIG. 3, the ratio R is compared with predetermined acceptable $R_{(upper)}$ and $R_{(lower)}$ ratio values in step 170. If the ratio R is determined to exceed either limit, a warning will be activated at step 180. The process then returns to start. A warning may be a light emitting device, an audio alarm, or both. In some instances, the equipment may be shut down to prevent out-of-tolerance adhesive from being delivered to the work piece. Alternatively, the warning may be delayed until a predetermined number of sampling cycles have been completed in which it is consistently determined that the ratio R is outside of the preset control limits.

Another embodiment 200 of the present invention is shown in conjunction with FIGS. 1 and 3 (method steps 191, 193, 195 & 197). An ideal ratio value "Ri" is determined. The calculated ratio R is compared with the ideal ratio Ri in steps 191 and 193. Variations from that ideal value are determined and appropriate feedback adjustments are made to the controller in order to adjust the supply system to increase or decrease a particular constituent through pump A in step 195 or pump B in step 197, as appropriate. If R is determined to be decreasing in step 191, pump A is adjusted in step 195. If R is not determined to be decreasing in step 191, step 193 determines if R is increasing. If R is found to be increasing in step 193, pump B is adjusted in step 197 to compensate. After each adjustment at steps 195, or 197, the process returns to start. In FIG. 1, this feedback is represented as dashed lines between the ratio monitor 40 and the programmed controller 50. Alternatively to the single drive unit 32, separate drive units could be employed to more precisely control the feedback adjustments to each metering rod.

It should be understood that the present invention described herein is illustrative. Therefore, the terminology used is intended to be in the nature of words of description rather than limitation. It should be further understood that many modifications and variations of the present invention are possible in light of the above teachings. Therefore, it is believed that, within the scope of the appended claims, the present invention may be practiced otherwise than as specifically described.

We claim:

1. A system for monitoring the proportional volume of constituents provided to a mixture, comprising:

means for providing a flowing volume of a first predetermined constituent tagged with a detectable material dispersed throughout said constituent;

means for providing a flowing volume of a second predetermined constituent;

means for mixing said flowing volumes of first and second constituents;

first means for sensing the concentration of the detectable tagging material in said first constituent as it flows in said first constituent flowing means;

second means for sensing the concentration of detectable tagging material mixed in said first and second constituents in said mixing means; and further including means connected to said first and second sensing means for determining the respective concentration values of tagging material in said flowing volumes, wherein said determining means periodically calculates the ratio of first and second constituents flowing in said mixing means by sampling said respective concentration values, subtracting the concentration value sensed by said second means from the concentration value sensed by said first means to obtain a first result and dividing the concentration value sensed by said second means by said first result.

2. A system as in claim 1, wherein said mixed constituents form an adhesive consisting of a resin constituent and a hardener constituent.

3. A system as in claim 1, wherein said tagging material is a ferromagnetic particle filler and said sensors are eddy current sensors.

4. A system as in claim 1, further including means connected to said first and second sensing means for determining the respective concentration values of tagging material in said flowing volumes and periodically sampling and comparing said sensed concentration values with a predetermined range of acceptable concentration values.

5. A system as in claim 1, in which said determining means compares said calculated ratio with a predetermined range of acceptable ratios and provides an output signal when said calculated ratio is outside said predetermined range.

6. A system as in claim 1, in which said determining means compares said calculated ratio with a predetermined range of acceptable ratio values and provides an output signal when said calculated ratio approaches predetermined limits within said predetermined range.

7. A system as in claim 6, further including means for pumping said first and second constituents into said providing means, wherein said pump means receives the output signal from said determining means and adjusts the flowing volumes of said first and second constituents to maintain said ratio to values that are within said predetermined range of ratio values.

8. A system as in claim 1, further including means for pumping said first and second constituents into said providing means, and said determining means monitors the flow rate provided by said pump means, wherein said first sensing means is upstream from said second sensing means and said determining means calculates a time delay factor based on the flow rate, the known predetermined volume of first constituent material present between said first and second sensors and the periodic cycle time between sensor samplings.

9. A system as in claim 8, wherein said determining means utilizes said time delay factor to select the concentration value sensed by said first sensor means at a time that corresponds to the time the concentration value is sensed by said second means minus said time delay factor.

10. A method of monitoring the proportional volume of constituents provided to a mixture, comprising the steps of:

providing a flowing volume of a first predetermined constituent tagged with a detectable material dispersed throughout said constituent;

providing a flowing volume of a second predetermined constituent;

mixing said flowing volumes of first and second constituents;

sensing the detectable tagging material in said first constituent as it flows alone at a point prior to said step of mixing;

sensing the detectable tagging material at a point in a flowing mixture of said first and second constituents; and determining the respective concentration values of tagging material in said flowing volumes by periodically sampling and calculating the ratio of first and second constituents flowing in said mixture by periodically subtracting the sensed concentration value of said tagged material alone from the sensed concentration value of said mixture to obtain a first result and dividing the sensed concentration value of said mixture by said result.

11. A method as in claim 10, wherein said mixed constituents form an adhesive consisting of a resin constituent and a hardener constituent.

12. A method as in claim 10, wherein said tagging material is a ferromagnetic particle filler and said sensing steps are performed by using eddy current sensors.

13. A method as in claim 10, further including the step of determining the respective concentration values of tagging material in said flowing volumes by periodically sampling and comparing said sensed concentration values with a predetermined range of acceptable concentration values.

14. A method as in claim 10, in which said step of determining includes the steps of comparing said calculated ratio with a predetermined range of acceptable ratios and providing a warning when said calculated ratio is outside said predetermined range.

15. A method as in claim 10, in which said step of determining includes the steps of comparing said calculated ratio with a predetermined range of acceptable ratios and providing a warning when said calculated ratio approaches predetermined limits within said predetermined range.

16. A method as in claim 15, in which the flow volumes of said first and second constituents are adjusted to maintain said ratio to a value that is within a predetermined range of values.

17. A method as in claim 10, wherein said step of sensing said tagged constituent alone is performed upstream from and prior to sensing said mixture and said step of determining includes the step of calculating a time delay factor based on the flow rate of the tagged material alone and the known distance between the points at which said steps of sensing the tagged material alone and sensing the mixture occur.

18. A method as in claim 17, wherein said step of determining utilizes said time delay factor to select the concentration value of said tagged constituent alone sensed at a time that corresponds to the time the mixture concentration value is sensed, minus the time delay factor.

* * * * *